(12) United States Patent
Allidieres et al.

(10) Patent No.: US 12,163,627 B2
(45) Date of Patent: Dec. 10, 2024

(54) METHOD FOR DELIVERING LIQUEFIED GAS

(71) Applicant: L'Air Liquide, Societe Anonyme pour l'Etude et l'Exploitation des Procedes Georges Claude, Paris (FR)

(72) Inventors: Laurent Allidieres, Paris (FR); Thomas Fayer, Sassenage (FR); Pierre Barjhoux, Sassenage (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 662 days.

(21) Appl. No.: 17/168,527

(22) Filed: Feb. 5, 2021

(65) Prior Publication Data
US 2021/0247027 A1    Aug. 12, 2021

(51) Int. Cl.
*F17C 5/04* (2006.01)
*F17C 5/06* (2006.01)

(52) U.S. Cl.
CPC .......... *F17C 5/04* (2013.01); *F17C 5/06* (2013.01); *F17C 2221/012* (2013.01);
(Continued)

(58) Field of Classification Search
CPC ........ F17C 5/04; F17C 5/06; F17C 2221/012; F17C 2265/063; F17C 2270/0136; F17C 2270/0171; F17C 2201/0104; F17C 2201/0128; F17C 2201/035; F17C 2201/054; F17C 2223/0161;
(Continued)

(56) References Cited

U.S. PATENT DOCUMENTS 2,958,205 A * 11/1960 McConkey ............. F17D 1/005
48/190
3,114,344 A    12/1963 Meade
(Continued)

FOREIGN PATENT DOCUMENTS

| DE | 12 77 059 | 9/1968 |
| EP | 1 691 127 | 8/2006 |
| FR | 3 018 111 | 9/2015 |

OTHER PUBLICATIONS

French Search Report and Written Opinion for FR 2 001 121, mailed Sep. 8, 2020.

*Primary Examiner* — Miguel A Diaz
*Assistant Examiner* — Ibrahim A. Michael Adeniji
(74) *Attorney, Agent, or Firm* — Justin K. Murray

(57) ABSTRACT

Method for delivering liquefied gas, especially hydrogen, by means of at least one mobile storage facility, especially a storage facility transported by lorry, comprising a step of filling the mobile storage facility with liquefied gas at a source plant, the mobile storage facility containing, after filling, liquefied gas and a fraction of the vaporized gas, the method comprising a movement of the mobile storage facility from the source plant to a receiving station and a transfer of liquefied gas from the mobile storage facility to the receiving station, characterized in that it comprises a step of interim cooling of the liquefied gas contained in the mobile storage facility between the source plant and the receiving station by means of a cooling device comprising a liquefied gas tank and a refrigerating element.

18 Claims, 1 Drawing Sheet

(52) U.S. Cl.
CPC .................. *F17C 2265/063* (2013.01); *F17C 2270/0136* (2013.01); *F17C 2270/0171* (2013.01)

(58) Field of Classification Search
CPC ........ F17C 2223/0169; F17C 2223/033; F17C 2225/0161; F17C 2225/0169; F17C 2227/0355; F17C 2227/0388; F17C 2265/033; F17C 2265/061; F17C 6/00; F17C 7/02; F17C 2227/0337; F17C 2227/041; F17C 9/00; F17C 13/00; F17C 2227/0353; Y02E 60/32; F25J 1/001; F25J 1/0228

See application file for complete search history.

(56) References Cited

U.S. PATENT DOCUMENTS

| | | | | |
|---|---|---|---|---|
| 3,256,705 | A * | 6/1966 | Dimentberg | F17D 1/02 62/50.1 |
| 4,024,720 | A * | 5/1977 | Dimentberg | F17D 1/02 137/13 |
| 2003/0021743 | A1* | 1/2003 | Wikstrom | F17C 5/06 422/198 |
| 2006/0156742 | A1* | 7/2006 | Farese | F17C 6/00 62/53.2 |
| 2006/0156743 | A1* | 7/2006 | Farese | F17C 6/00 62/53.2 |
| 2008/0178612 | A1* | 7/2008 | Utata | F17C 7/04 62/50.2 |
| 2014/0263362 | A1* | 9/2014 | Schimp | F17C 5/06 220/567.1 |
| 2015/0000334 | A1 | 1/2015 | Edwards | |
| 2019/0257475 | A1* | 8/2019 | Bernhardt | F17C 5/04 |

* cited by examiner

METHOD FOR DELIVERING LIQUEFIED GAS

CROSS-REFERENCE TO RELATED APPLICATIONS

This application claims the benefit of priority under 35 U.S.C. § 119 (a) and (b) to French patent application No. FR 2001121, filed Feb. 5, 2020, the entire contents of which are incorporated herein by reference.

BACKGROUND

Field of the Invention

The invention relates to a method for delivering liquefied gas.

The invention relates more particularly to a method for delivering liquefied gas, especially hydrogen, by means of at least one mobile storage facility, especially a storage facility transported by lorry, comprising a step of filling the mobile storage facility with liquefied gas at a source plant, the mobile storage facility containing, after filling, liquefied gas and a fraction of the vaporized gas, the method comprising a movement of the mobile storage facility from the source plant to a receiving station and a transfer of liquefied gas from the mobile storage facility to the receiving station.

Related Art

Because of its greater density, hydrogen in liquid form is preferred when large amounts of product must be transported over long distances or stored.

At low temperature, fairly substantial evaporation losses may occur (or significant reheating of the liquid during transport and product transfers). Typically, when it is transported by road, this product undergoes from 0.5 to 1 K reheating per day. This reheating may give rise to evaporation losses, which can, of course, be recovered, reheated, compressed after storage and reinjected into a liquefier. However, this gives rise to added cost.

As a result of this reheating, when the liquid remains in equilibrium at its saturation pressure, there is an increase in pressure in the storage facility and also a thermal expansion of the hydrogen (i.e. a drop in density). The main intended use for liquid hydrogen is in service stations for fuel-cell vehicles, where liquid hydrogen is pumped using volumetric pumps. There is therefore an interest in keeping the hydrogen as dense as possible, and hence at the lowest possible temperature.

Moreover, the greater the delivery of dense (cold) hydrogen, the greater the mass filling of the station reservoir, which has a fixed volume. It is therefore of advantage for these reasons to maintain the hydrogen as cold as possible (or in the lowest possible pressure, if the liquid is in equilibrium with its vapour phase).

SUMMARY OF THE INVENTION

An aim of the present invention is to overcome all or some of the aforementioned disadvantages of the prior art.

For this purpose, the method according to the invention, which is otherwise in accordance with the generic definition provided by the preamble above, is essentially characterized in that it comprises a step of interim cooling of the liquefied gas contained in the mobile storage facility between the source plant and the receiving station by means of a cooling device comprising a liquefied gas tank and a refrigerating element.

Furthermore, embodiments of the invention may comprise one or more of the following features:
- the interim cooling step comprises a removal of liquefied gas from the mobile storage facility and an exchange of heat between this removed liquefied gas and the refrigerating element outside and/or inside the liquefied gas tank,
- the refrigerating element comprises a refrigerator which is cryogenic, in other words is at a temperature of between minus 100 degrees centigrade and minus 273 degrees centigrade, said refrigerator comprising a working circuit forming a loop and containing a working fluid, the working circuit forming a cycle comprising in series: a mechanism for compressing the working fluid, a mechanism for cooling the working fluid, a mechanism for expanding the working fluid and a mechanism for reheating the working fluid, the refrigerator comprising a heat exchange portion permitting an exchange of heat between the working fluid expanded in the expansion mechanism and the storage facility and/or the fluid of the mobile storage facility,
- in the working circuit, the working fluid performs a thermodynamic cycle of reverse Ericsson type,
- the interim cooling step comprises a withdrawal of vaporized gas contained in the mobile storage facility to the outside of the mobile storage facility, a cooling of this withdrawn vaporized gas and an injection of this cooled gas into the liquefied gas tank,
- the interim cooling step comprises a withdrawal of vaporized gas contained in the mobile storage facility to the outside of the mobile storage facility and a direct injection of this cooled gas into the liquid phase of the liquefied gas of the liquefied gas tank,
- the distance between the cooling device and the receiving station is less than a hundred kilometres and especially less than the distance between the source plant and the cooling device.

The invention can also relate to any alternative device or method comprising any combination of the features above or below within the scope of the claims.

BRIEF DESCRIPTION OF THE FIGURES

Further features and advantages will become apparent upon reading the following description, which is provided with reference to the figures, in which.

DETAILED DESCRIPTION OF THE INVENTION

Figure 1:
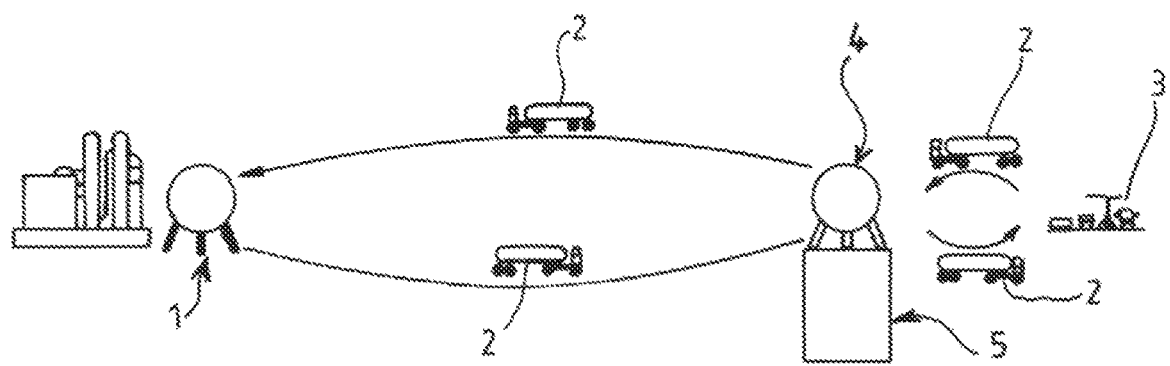
FIG. 1 represents a schematic and partial view illustrating one example of the structure and operation of the invention.

The system for production and delivery of liquefied gas, especially of liquid hydrogen, comprises a source plant 1, which produces and stores liquefied hydrogen (produced by electrolysis and/or reforming or any other appropriate technology). This hydrogen is liquefied by one or more liquefiers and can be stored in cryogenic containers.

The system comprises at least one mobile storage facility 2 (cryogenic storage facility mounted on a lorry, for example).

This mobile storage facility 2 is filled with liquefied gas at the source plant 1 before being moved from the source plant 1 to at least one receiving station 3 (comprising a fixed cryogenic container for storing the liquid). Conventionally, the mobile storage facility 2 contains liquefied gas in a lower part and a fraction of this gas in vaporized form in an upper part.

According to one advantageous feature, an interim cooling step for the liquefied gas contained in the mobile storage facility 2 is provided between source plant 1 and the receiving station 3. This interim cooling is performed via a cooling device comprising a liquefied gas tank 4 and a refrigerating element 5. The cooling device is a unit separate from the mobile storage facility; for example, a fixed intermediate station at a particular site on the path between the source plant 1 and the receiving station 3. For example, the liquefied gas tank 4 contains the same gas as that transported in the mobile storage facilities 2. This liquefied gas in the storage facility 4 may be kept cold and even subcooled by the refrigerating element 5.

For example, the mobile storage facilities 2 are filled at a hydrogen liquefaction plant 1, and then the product is transported over distances of the order, for example, of 200 to 1000 km, for subsequent delivery to one or more receiving stations 3.

For a transport of 1000 km in 24 h, the liquid may heat up by 1 K, for example. The density in that case is reduced by 2 kg/m3. The pumps which will use it downstream will then suffer an efficiency loss of approximately 3%, and the tank to which delivery is made will also lose in the order of 3% of storage capacity, relative to a denser hydrogen. These estimates, however, take no account of the waiting times of the mobile storage facilities 2 before starting their round, nor of the inefficiencies in the logistic loop. In certain cases, the loss of efficiency and storage may reach 6%.

The intermediate tank 4 and cooling 5 enable recooling of the fluid which has undergone excessive reheating during long-distance transportation. In this way it is possible to decouple the delivery path into two steps: a first step of transporting over a relatively longer distance (typically between 500 and 1000 km), during which the liquid undergoes reheating, and then a second step of shorter distance, in which the hydrogen remains relatively colder. This enables the use of a denser liquid hydrogen at the inlet of the receiving tank of the receiving station 3 and of the corresponding pumps, and therefore to gain storage and pumping capacity in identical equipment. In this way it is possible to increase the daily capacity of the receiving station 3 and its autonomy between two deliveries.

With this solution it is possible to avoid the investment in a system for recirculating the vaporization gas (boil-off) and the oversizing of the source liquefier 1 (at the expense of a small extra energy cost for liquefaction, as explained below).

The distance between the interim cooling device 4, 5 and the receiving station or stations 3 is preferably between 50 and 100 km. The reheating of the fluid is therefore minimal during the final transport. This may give rise to a gain of possibly up to 6% in the pumping capacity of the receiving station 3 and in the autonomy of the tank of the receiving station 3 between two deliveries.

The refrigerating element 5 preferably comprises a cryogenic refrigerator, this being an apparatus which produces cold at a temperature of between minus 100 degrees centigrade and minus 273 degrees centigrade. The cryogenic refrigerator 5 therefore comprises a working circuit forming a loop and containing a working fluid (helium and/or any other atmospheric gas). The working circuit forms a cycle comprising in series: a mechanism for compressing the working fluid, a mechanism for cooling the working fluid, a mechanism for expanding the working fluid and a mechanism for reheating the working fluid, the refrigerator comprising a portion for heat exchange between the working fluid expanded in the expansion mechanism and the element to be cooled (the storage facility 4 or the fluid it contains and/or the fluid of the mobile storage facility 2 as described below).

The working cycle preferably performs a thermodynamic cycle which is or is close to a reverse Ericsson cycle. One such cryogenic refrigerator is, for example, a machine of the Tubro Brayton type, sold by the Applicant.

The liquid of the mobile storage facility 2 may be cooled indirectly, for example by circulating the liquid to a cold point outside the tank 4. For example, the liquefied gas of the mobile storage facility 2 is brought into a heat exchanger which carries out exchange with the working fluid of the tank refrigerator 5.

Alternatively or cumulatively, this cooling may be carried out directly in/with a heat exchanger situated in the storage facility 4. The liquefied gas of the mobile storage facility 2 may thus be brought into a heat exchanger which carries out exchange of heat with the working fluid in the tank 5.

The cooled fluid is returned to the mobile storage facility 2.

Figure 2:
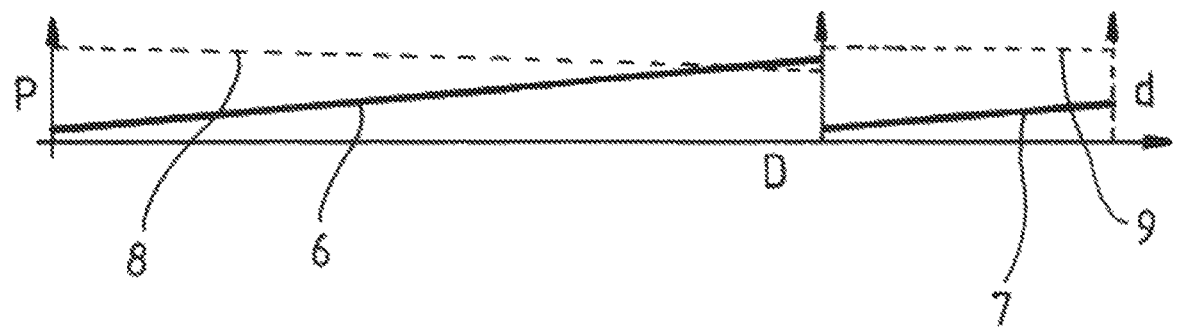
FIG. 2 represents a graph schematically illustrating variations in pressure and in density depending on the distance within a mobile storage facility, according to one use example of the invention.

FIG. 2 shows in solid lines 6, 7 an example of curves of variation in pressure P of the liquid hydrogen stored in the mobile storage facility 2 as a function of the distance D during the first step of movement and during the second step of movement (the two steps are separated at the discontinuity). The curves 8, 9 in dashed lines represent examples of corresponding variations in the density (d) of the liquid hydrogen stored in the mobile storage facility 2 during the first step of movement and during the second step of movement.

It is found that the step of interim cooling of the liquefied gas allows a decrease in the pressure and an increase in the density of the transported liquefied gas, which will be delivered to receiving stations 3.

The liquefied gas tank 4 of the cooling device may have a cylindrical or spherical geometry.

The system is able, where appropriate, to recover the vapours of the mobile storage facility 2, to cool them (via the cooling device 4, 5) and to inject them into the liquefied gas tank 4 (and/or into the mobile storage facility 2). For example, these cooled and, where appropriate, liquefied vapours may be reinjected to the gas space (upper part) of the liquefied gas tank 4 to lower its pressure.

For example, these vapours may be recovered and injected directly (without prior cooling) into the liquid phase of the liquefied gas tank 4 (in the lower part).

For example, there may be a temperature gap between the relatively hotter fluid which is injected into the intermediate liquefied gas tank 4 and the relatively colder fluid which is removed from this intermediate tank 4. This temperature gap may be variable depending, for example, on the number of storage facilities to be cooled.

The system is able, where appropriate, to carry out management of flash gases ("BOG") outside the production sites 1 (liquefiers) close to the users 3 (simplification of the management of these vaporization gases "BOG").

It is possible to put in place a local distribution network (with a radius of less than 100 km, for example) between the refrigerated liquefied gas tank 4 and the end users. Mobile storage facilities 2 and/or insulated lines may be provided for distributing the fluid from the liquefied gas tank 4 to users.

Similarly, it is possible for there to be a local recovery network put in place for the vaporization gases (BOG) between the liquefied gas tank 4 and the end users.

This tank 4 of liquefied gas (cooled or subcooled by the refrigerating element 5) may be used as a cold reserve (use of the relatively colder liquid).

The fluid in the top part (gas) may be used as a thermal buffer for the entering material (fluid), with the cold material at the bottom of the tank being used to supply consumers.

The invention therefore exhibits a number of advantages. The density of the liquid available at the receiving stations 3 is increased (and the temperature is lower than according to the prior art).

A system of this kind enables a reduction in the flash gases (BOG) and therefore in losses in particular in the local distribution network. The management of the flash gases at the sites allows their management by a liquefier to be alleviated or even done away with. The reason is that there would be no hot gas hold-up generated in the liquefier; any such hold-up could significantly impact the liquid production capacity.

The management of the flashes is made possible at sites 2 which are distant from the liquefiers 1 (especially if a site is a receiving station 3 which consumes hydrogen and itself gives rise to vaporization gases (BOG)).

The invention makes it possible to increase the transport distance of cryogenic gases by optimizing, where appropriate, the logistical solution with mobile storage facilities 2 of high carrier capacity for the first, primary logistical transport step, and more reduced, more manoeuvrable mobile storage facilities for the second transport phase (access to service stations in a city centre, for example).

The mobile storage facilities 2 may be transported by lorries, thereby enabling optimized urban and inter-urban transport.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A method for delivering liquefied gas using at least one mobile storage facility transported by lorry, comprising the steps of:
   a) filling the mobile storage facility with liquefied gas at a source plant, the mobile storage facility containing, after filling, liquefied gas and a vaporized amount of liquefied gas;
   b) moving the mobile storage facility from the source plant to an intermediate location;
   c) cooling the liquefied gas contained in the mobile storage facility using a cooling device, the cooling device comprising a liquefied gas tank and a refrigerating element;
   d) moving the mobile storage facility from the intermediate location to a receiving station; and
   e) transferring liquefied gas from the mobile storage facility to the receiving station, wherein the cooling device is disposed at a fixed location such that the cooling device does not move with the mobile storage facility during steps b) and d).

2. The method of claim 1, wherein said cooling step comprises the steps of removing liquefied gas from the mobile storage facility and exchanging heat between the removed liquefied gas and the refrigerating element with a heat exchanger that is located outside the liquefied gas tank.

3. The method of claim 1, wherein said cooling step comprises the steps of removing liquefied gas from the mobile storage facility and exchanging heat between the removed liquefied gas and the refrigerating element with a heat exchanger that is located inside the liquefied gas tank.

4. The method of claim 1, wherein said cooling step comprises withdrawing vaporized gas contained in the mobile storage facility to a location outside the mobile storage facility, cooling the withdrawn vaporized gas, and injecting the cooled gas into the liquefied gas tank.

5. The method of claim 1, wherein said cooling step comprises withdrawing vaporized gas contained in the mobile storage facility to a location outside the mobile storage facility and directly injecting the cooled gas into the liquefied gas in the liquefied gas tank.

6. The method of claim 1, wherein a distance between the source plant and the cooling device is greater than a distance between the cooling device and the receiving station.

7. The method of claim 6, wherein the distance between the cooling device and the receiving station is less than 100 km.

8. The method of claim 1, wherein a distance between the cooling device and the receiving station is less than 100 km.

9. The method of claim 1, wherein the liquefied gas is liquefied hydrogen.

10. The method of claim 1, wherein the cooling is done using indirect heat exchange.

11. A method for delivering liquefied gas using at least one mobile storage facility transported by lorry, comprising the steps of:
    filling the mobile storage facility with liquefied gas at a source plant, the mobile storage facility containing, after filling, liquefied gas and a vaporized amount of liquefied gas;
    moving the mobile storage facility from the source plant to a first location having a cooling device;
    cooling the liquefied gas contained in the mobile storage facility using the cooling device, the cooling device comprising a liquefied gas tank and a refrigerating element;
    moving the mobile storage facility from the first location to a receiving station; and
    transferring liquefied gas from the mobile storage facility to the receiving station,
    wherein the cooling device is further configured to cool a plurality of mobile storage facilities.

12. The method of claim 11, wherein a distance between the source plant and the cooling device is greater than a distance between the cooling device and the receiving station.

13. The method of claim 12, wherein the distance between the cooling device and the receiving station is less than 100 km.

14. The method of claim 11, wherein a distance between the cooling device and the receiving station is less than 100 km.

15. The method of claim 11, wherein the liquefied gas is liquefied hydrogen.

16. The method of claim 11, wherein the cooling device is releasably connectable to the mobile storage facility.

17. The method of claim 1, wherein the cooling is configured to cool a plurality of mobile storage facilities.

18. The method of claim 1, wherein the cooling device is releasably connectable to the mobile storage facility.

* * * * *